United States Patent [19]

Moe

[11] 4,246,781

[45] Jan. 27, 1981

[54] ARRANGEMENTS FOR MEASURING TENSION LOADING IN WIRES

[75] Inventor: Magne Moe, Harstad, Norway

[73] Assignee: Kaarbøs Mek. Verksted A/S, Harstad, Norway

[21] Appl. No.: 25,872

[22] Filed: Apr. 2, 1979

[30] Foreign Application Priority Data

Apr. 4, 1978 [NO] Norway .................................. 781176

[51] Int. Cl.3 .............................................. G01L 5/10

[52] U.S. Cl. .................................................. 73/143

[58] Field of Search ......................... 73/143, 144, 781; 254/173 B

[56] References Cited

U.S. PATENT DOCUMENTS 3,802,258 4/1974 Clarke et al. .......................... 73/143

FOREIGN PATENT DOCUMENTS 2117477 12/1971 Fed. Rep. of Germany .

*Primary Examiner*—Charles A. Ruehl

*Attorney, Agent, or Firm*—McCormick, Paulding & Huber

[57] ABSTRACT

Arrangement for measuring tension loading in wires. A winch has a foundation-forming, first base member and a second base member permanently connected to the former member by way of shanks disposed therebetween. A support arm is mounted in between the base members with connection therewith on opposite sides of a gap formed by the shanks. A cell is arranged in the support arm for determining tension or pressure forces by measuring mutual movements of the second base member relative to the first base member. An indicating device is electrically connected to the cell enabling measured results to be displayed as an expression of the tension loading in the wire.

8 Claims, 6 Drawing Figures

ARRANGEMENTS FOR MEASURING TENSION LOADING IN WIRES

Figure 1:
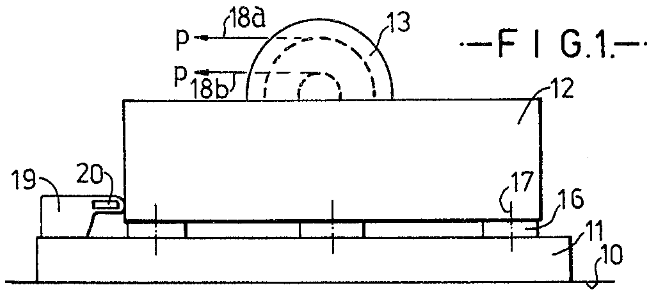

This invention relates to an arrangement for measuring tension loading in wires via a measuring device secured to a holding means for the wire.

According to the invention the aim is to measure the tension in a wire via a measuring device secured to an arbitrary holding means. A particular aim is to be able to utilize new as well as conventional holding means without substantial complications.

The present invention finds particular application on board ship in connection with wires, for example, hawsers and like cables which are controlled by a winch, such as cargo winches, trawl winches, towing winches etc., but can also find application in connection with the anchoring of wire to other holding means, such as bollards on land or on board bore rigs or in another vessel, in connection with sea-borne anchoring buoys which are used on loading or unloading tankers etc.

Various methods are known for measuring tension forces in wires. For example, there can be mentioned methods for measuring arrow height variations in the wire by allowing the wire to pass in an arcuate or wave-shaped path through a measuring apparatus having mechanical pressure-responsive means which is arranged directly around the wire itself. A problem with such measuring apparatuses is that the wire can vary significantly in diameter during tension loading and therefore cannot indicate accurately comparable measurements during all conditions. It is also known in connection with winches, to measure the tension loading in the wire hydraulically via the hydraulic apparatus of the winch or mechanically via a tension-responsive means in connection with a brake band or other equipment, the tension in the wire being measured on the basis of a torque arm. However, the tension in the wire is allotted different sizes depending upon the number of layers of wire which are employed on the winch drum during the measuring operation (different torque arms). Under such conditions, it will not be possible to read off the tension in the wire directly in the measuring device, one being dependent upon calculation tables or relatively complicated calibration devices in addition. It is also known to allow one bearing block-forming base member of the winch to be pivotably mounted at the rear edge of a foundation-forming base member of the winch while there is utilized a pressure-sensative measuring cell between the base members at the front edge of the winch. Such a solution is only possible with winches which transfer modest forces from the one base member to the other since it is ordinarly difficult to anchor the base members in a secure manner relative to each other.

With the present invention the aim is to provide a measuring arrangement in which the tension in the wire, for example, hawsers and like cables can be read off directly in a fairly accurate manner independently of whether the wire is held stationary in the holding means or is moveable relative to the holding means as during paying out or hauling in of wire of a winch. In other words, it will be almost independent of the number of layers of wire which are present on a winch drum and independent of the diameter of the wire.

According to the present invention an arrangement for measuring tension loading in wire comprises (a) holding means to which one end of the wire is fastened while under tension, said holding means having first and second portions, (b) a support arm having one end permanently connected to said first portion and its opposite end connected to said second portion at a predetermined distance from said first portion, (c) said portions being connected rigidly to each other, (d) cell means arranged in said support arm for determining tension or pressure forces by measuring mutual movements of said second portion relative to said first portion, and (e) indicating means electrically connected to said cell means for displaying measured results as an expression of the tension loading in the wire.

Figure 2:
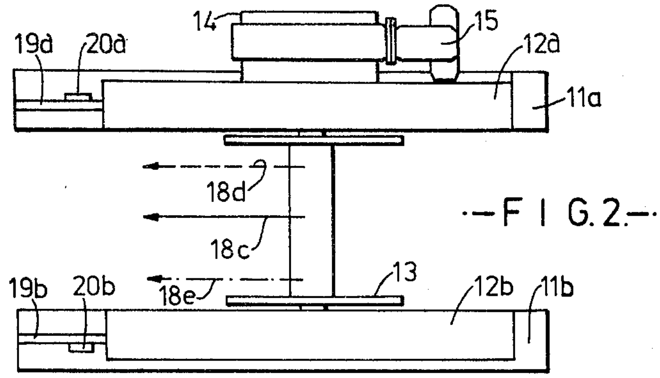
Figure 3:
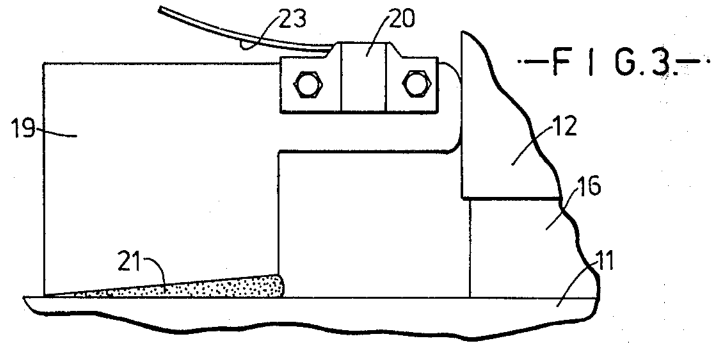
Figure 4:
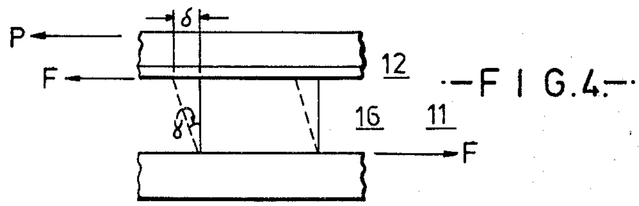
Figure 5:
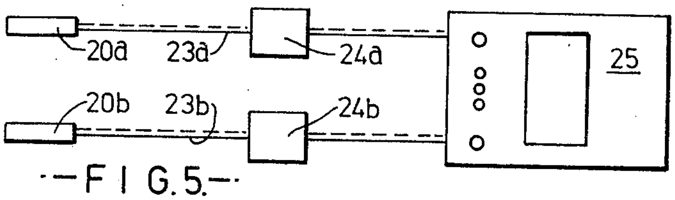
Figure 6:
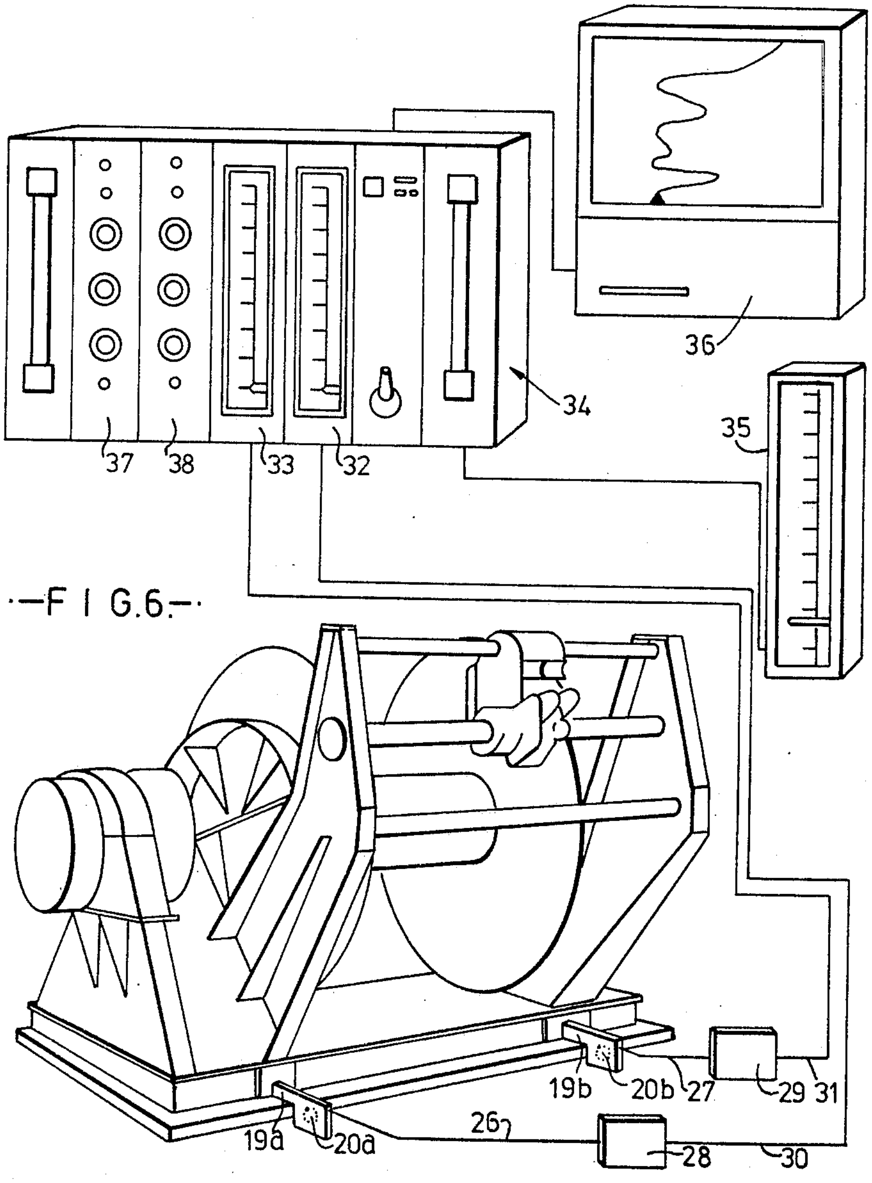

In order that the invention can be more clearly understood, a preferred embodiment thereof will now be described, by way of example, with reference to the accompanying drawings, in which:

FIG. 1 is a side view showing schematically a measuring arrangement incorporating a winch, FIG. 2 is a plan of the arrangement of FIG. 1, FIG. 3 is a scrap side view of part of the measuring arrangement on an enlarged scale, FIG. 4 is a scrap schematic representation of one of the connections between bearing block and deck-supported base via an intermediate shank, an angular deformation of the shank being shown in broken lines, FIG. 5 is a schematic representation showing a coupling together of two measuring cells in connection with a common control panel, FIG. 6 is a perspective view of the winch having the two measuring devices secured at a lower portion thereof between block and deck-supported base.

Referring to FIG. 1, a deck 10 of a ship supports a winch 11–15. The winch comprises a first base member in the form of a deck-supported base 11 and another base member in the form of a bearing block 12 in which there is rotatably mounted a winch drum 13. At 14, there is shown a hydraulic drive motor and at 15 there is shown the control valve of the winch and the like. The winch is illustrated very schematically for the sake of simplicity.

Shanks 16 are located between the base members, the latter being connected to each other via fastening bolts (shown schematically at 17) which pass through their respective shanks. By employing such shanks known per se, the base members can be fastened in a conventional manner by simple means and in precise fashion relative to each other without substantial finishing of the surfaces of the base members directed towards each other.

Base 11 is shown in FIG. 2 in the form of two separate base members 11*a* and 11*b*, but in practice the two separate base members can be mutually connected to each other by means of two or more transverse support members to form an annular or grate-shaped frame member. In a corresponding way the block 12 is shown in the form of two separate bearing blocks 12*a*, 12*b* which, in practice, can be connected to each other by means of transverse support members in a manner corresponding essentially to the block 12. The said transverse support members are left out of the drawing in order to simplify the general view, the support members not constituting any essential function in the solution according to the invention and can, therefore, almost be disregarded in considering the loading which is to be measured with the measuring arrangement according to the invention.

The wire 18, in FIG. 1, is shown by broken line 18*a* at a radial inner position on the drum 13 and by the full line 18*b* in a radial outer position on the drum. In FIG. 2 the wire 18 is shown by the full line 18*c* in a central position on the drum 13 and respectively by the broken line 18*d* and by the chain line 18*e* in two outer side positions on the drum.

Two separate measuring devices 19, 20 (FIG. 1) are arranged at the front edge of the winch, that is to say a first measuring device 19*a*, 20*a* fixed between the one base member 11*a* and the other base member 12*a* and a similar second measuring device 19*b*, 20*b* fixed between the one base member 11*b* and the other base member 12*b*.

Each measuring device comprises a support arm 19 which supports a measuring cell 20. One end of the support arm 19 is permanently welded to the top surface of the base 11, while the opposite end of the support arm forms, with a certain prestressing, a supporting abutment against a vertical, forwardly directed surface of the block 12. A ready and easily controllable prestressing can be obtained by fixing said one end of the support arm 19 to the base 11 with a wedge-shaped weld. The wedge-shaped weld is obtained, for example, by employing a sloping under side surface 21 on the under side of the support arm, as is shown in FIG. 3.

On tension P arising in the wire 18, the intermediate shanks 16 are exposed to significant deformation loadings, movement between the block 12 and the shanks and between the base 11 and the shanks being respectively prevented by means of a friction force which occurs between them. By means of the measuring cell 20 and the support arm 19 which span the gap between the shanks, the displacement of the block 12 relative to the base 11 can be measured as a function of the tension in the wire 18. As a consequence of the large natural rigidity of the base members 11, 12 compared with the natural rigidity of the shanks 16, one can, in practice, largely disregard deformations which occur in the base members and only consider the deformations in the shanks, that is to say the mutual movement between the base members as an expression of the loading from the wire against the winch. For the same reason, one can also disregard in practice the torque arm variations which are due to variations in the number of layers of wire on the drum of the winch (see the wire paths 18*a* and 18*b* in FIG. 1), that is to say the generally conventional torque effect, which can provide big fluctuations in other types of measuring methods, can be largely disregarded in the solution according to the invention.

In FIG. 4, there is shown part of the deck-supported base 11, the bearing block 12 and a shank 16 located therebetween. As already mentioned, block 12 can be connected to base 11 by a bolt (not shown) passing through the shank 16. The bolts are fixed with a torque of, for example, 35 Nm. Alternatively, the block 12 and base 11 can be permanently welded together via the shanks 16. Arrow P indicates the tension force in the wire while arrow F indicates the friction force which acts between the block 12 and the shank 16 and between the shank 16 and the base 11 respectively. Provision is made for establishing that the friction force F is substantially higher than the maximum permitted tension force P in the wire. On exerting a tension force P in the wire, a deformation displacement of the block 12 can be measured with the aid of the measuring device with a measured off distance $\delta$ corresponding to deformation angle $\alpha$ (see broken lines in FIG. 4).

According to FIG. 5, a first measuring cell 20*a* on one side of the winch and a second measuring cell 20*b* on the other side of the winch are connected via shielded leads 23*a* and 23*b* to their respective signal amplifiers 24*a* and 24*b* and to a common control panel 25 in which there can be displayed, with indicating equipment known per se, the loading in each measuring cell individually or the sum of the loadings in the measuring cells. Consequently, there can be obtained a read off of the oblique load on the winch and of the load on the wire during the various laterally displaced positions of the wire on the drum (see the wire positions 18*c*, 18*d*, 18*e* in FIG. 2). In FIG. 6 measuring devices 19*a*, 20*a*; 19*b*, 20*b* are connected via leads 26, 27 to pre-amplifiers 28, 29 which, in turn, are connected by leads 30, 31 to potentiometers 32, 33 on a control board 34. The tension for each measuring device can be read off visually and individually in each of the potentiometers while the resultant tension can be read off on a third potentiometer 35 and on a writing unit respectively. Warning lamps and control knobs are illustrated, inter alia, on the panels 37, 38.

In the illustrated embodiment, there are shown two measuring cells arranged at the front edge of the winch, where the support arms are permanently welded at one end to the base 11 and at the opposite end form prestressed supporting abutments against the base 12. In certain instances, there can be employed, if desired, a single centrally arranged measuring cell instead of the two measuring cells shown arranged sideways. In other instances, extra measuring cells can be employed, in addition, for measuring laterally directed loads on the winch. Such extra measuring cells are supported in support arms, the main planes of which extend at right angles to the main plane through the support arm for the measuring cell 20*a* and 20*b* respectively. Instead of arranging the measuring devices at the front edge of the winch, they can be arranged equally well at the rear edge of the winch but in such a case or in a case with the said extra, laterally measuring devices, best results are obtained by permanent welding or securing the support arms in another manner at both their opposite ends.

While the preferred embodiment has been described with reference to a winch, it is apparent that the invention can also be employed in connection with other types of holding devices for wires, such as bollards, crane fastenings etc. In this connection, it is clear that arbitrary numbers of measuring devices can be used for each holding device, for example, use of measuring devices which are arranged with a suitable angular intermediate space around a two-part holding device, where the mutual displacement of the parts of the holding device can be measured in different radial directions.

While in the illustrated embodiment, the intermediate shanks are utilised as the measuring object for the mutual displacement between the base members, in practice there can also be employed the one base member bearing block 12 itself as the measuring object, for example, in a case where the base members form a direct abutment against each other face-to-face.

An essential feature according to the invention is that the displacement which occurs in the holding device or between the parts of the holding device is effected proportionally to the load on the holding device.

What I claim is :

1. An arrangement for measuring tension loading in a wire spaced from a support along a line perpendicular to said wire, which arrangement comprises:

(a) a holding means having a second portion to which one end of said wire is fastened and a first portion located between said second portion and said support, said first and second portions being rigidly connected to one another without springs and said first portion being connected to said support, (b) a support arm having one end connected to said first portion and its opposite end connected to said second portion at a predetermined distance from said first portion along a line perpendicular to said wire, (c) a cell means carried by said support arm for measuring mutual movements of said second portion relative to said first portion, and (d) indicating means electrically connected to said cell means for displaying measured results as an expression of the tension loading in the wire.

2. The arrangement of claim 1, wherein said first portion of said holding means is a base adapted to be fixed to a supporting surface, said second portion has an abutment surface extending generally perpendicular to said wire, and said support has its said one end fixed to said base and its said opposite end in abutting engagement with said abutment surface of said second portion, said support arm being held in a prestressed state by said first and second portions of said holding means when no load is on said wire.

3. The arrangement of claim 1 wherein said first portion of said holding means is a base adapted to be fixed to a supporting surface and said second portion is rigidly and permanently connected to said base at a plurality of locally defined regions by way of a plurality of shanks disposed between and rigidly connected to said first portion and said base, and said support arm spans the gap between said second portion and said base formed by said shanks.

4. The arrangement of claim 3, further characterized by said second portion of said holding means being a winch, two of said support arms and two of said associated cell means, said arms being arranged one on each side and outboard of said winch, said one end of each support arm being permanently welded to said base while said opposite end of each support forms a prestressed supporting abutment against said winch.

5. The arrangement of claim 4, wherein said permanent weld is of longitudinal wedge shape, and said base is for support on a ship's deck.

6. The arrangement of claim 1, further characterized by said first portion of said holding means being a base adapted to be fixed to a supporting surface extending generally parallel to said wire, said second portion having a forwardly facing abutment surface generally perpendicular to said wire, said base extending forwardly beyond said second portion, and said support arm being located in front of said abutment surface.

7. The arrangement of claim 6, further characterized by said support arm being a generally L-shaped plate having a leg generally perpendicular to said wire connected to said base and another leg generally parallel to said wire abutting said abutment surface.

8. The arrangement of claim 1, further characterized by said first portion of said holding means being a base adapted to be fixed to a ship's deck extending generally parallel to the wire, and said second portion of said holding means being a winch.

* * * * *